United States Patent
Wilhelmsson et al.

(10) Patent No.: US 7,433,433 B2
(45) Date of Patent: Oct. 7, 2008

(54) CHANNEL ESTIMATION BY ADAPTIVE INTERPOLATION

(75) Inventors: Leif Wilhelmsson, Dalby (SE); Bo Bernhardsson, Lund (SE); Lennart Andersson, Hjärnarp (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 646 days.

(21) Appl. No.: 10/920,928

(22) Filed: Aug. 18, 2004

(65) Prior Publication Data

US 2005/0105647 A1 May 19, 2005

Related U.S. Application Data

(60) Provisional application No. 60/519,261, filed on Nov. 13, 2003.

(51) Int. Cl.
*H04B 1/10* (2006.01)
(52) U.S. Cl. .................................................. 375/350
(58) Field of Classification Search ............... 375/260, 375/285, 316, 340, 342, 350, 348; 455/63.1, 455/65, 67.13, 114.2
See application file for complete search history.

(56) References Cited

U.S. PATENT DOCUMENTS

| | | | |
|---|---|---|---|
| 6,151,484 A * | 11/2000 | Ramesh | 455/68 |
| 6,542,562 B1 | 4/2003 | Östberg et al. | |
| 6,868,112 B2 * | 3/2005 | Kim et al. | 375/147 |
| 6,983,125 B2 * | 1/2006 | Smee et al. | 455/63.1 |
| 7,209,433 B2 * | 4/2007 | Scarpa | 370/206 |
| 2003/0012308 A1 * | 1/2003 | Sampath et al. | 375/340 |
| 2003/0123559 A1 * | 7/2003 | Classon et al. | 375/260 |

FOREIGN PATENT DOCUMENTS

GB 1110450 A 4/1968

OTHER PUBLICATIONS

H. Schober, Breitbandige OFDM Funkübertragung bei hohen Teilnehmergeschwindigkeiten, Prof. Dr. Rer. Nat. Friedrich Jondral, Jun. 5, 2003, pp. 47-92, Karlsruhe, Germany XP002418632.
H. Schober et al., Velocity Estimation for OFDM Based Communication Systems, Proc. IEEE 56th Vehicular Tech. Conf., Sep. 24, 2002, pp. 715-718 XP010608905.

(Continued)

*Primary Examiner*—Khanh C Tran
(74) *Attorney, Agent, or Firm*—Potomac Patent Group PLLC

(57) ABSTRACT

Methods and apparatus that achieve good channel estimation without using unnecessarily complex interpolation filters are described. Adaptive interpolation filtering of a signal in a receiver includes determining at least one correlation function parameter of the channel and determining a filter configuration based on the correlation function parameter. Interpolation filtering is then performed on the signal using the determined filter configuration. The interpolation may be performed in time, where a Doppler frequency shift can serve as the correlation function parameter, or in frequency, where a root mean square or maximum delay spread can serve as the correlation function parameter, or both. A worst case signal-to-noise ratio may be used in determining the filter configuration, or, optionally, the signal-to-noise ratio can determined in real time. The filter configuration can be determined in real time or selected from one of a plurality of predetermined configurations having different complexities.

26 Claims, 16 Drawing Sheets

OTHER PUBLICATIONS

H. Schober et al., Delay Spread Estimation for OFDM Based Mobile Communication Systems, Proc. European Wireless Conf., Feb. 2002, 625-628, vol. 1, Florence, IT XP002418629.

F. Sanzi et al., An Adaptive Two-Dimensional Channel Estimator for Wireless OFDM with Application to Mobile DVB-T, IEEE Trans. Broadcasting, Jun. 2000, pp. 128-133, vol. 46, No. 2 XP011006127.

M. Speth, Systemkomponenten für codierte OFDM-Übertragung mit Sender- und Empfängerdiversität, Oct. 24, 2000, pp. 71-91, Shaker Verlag, Aachen, Germany XP002418633.

European Search Report, EP Application 04797825.9, Mar. 5, 2007, pp. 1-6, European Patent Office.

J. Baltersee et al., "Performance Analysis of Phasor Estimation Algorithms for a FDD-UMTS Rake Receiver", Proc. IEEE 6th Intl Symposium on Spread-Spectrum Techniques & Applications, Sep. 6-8, 2000, pp. 476-480, vol. 2.

S. A. Fechtel, "Verfahren und Algorithmen der robusten Synchronisation für die Datenübertragung über dispersive Schwundkenale", 1993, pp. 71-84, Verlag Mainz, Aachen, Germany.

EPO, International Search Report, PCT/ISA/210, Jun. 24, 2005, 6 pages.

EPO, Written Opinion of the International Searching Authority, PCT/ISA/237, Jun. 24, 2005, 10 pages.

* cited by examiner

CHANNEL ESTIMATION BY ADAPTIVE INTERPOLATION

CROSS-REFERENCE TO RELATED APPLICATIONS

This application claims the benefit of U.S. Provisional Patent Application No. 60/519,261, filed on Nov. 13, 2003, by Leif Wilhelmsson and entitled, "Channel Estimation by Adaptive Interpolation," which is incorporated herein by reference.

BACKGROUND

This application relates to digital communication where the channel is estimated by pilot symbols. In particular, it relates to situations where it is desirable to avoid or reduce the use of high-order interpolation filters, because of the required memory and complexity for such filters. It also concerns related situations where it is desirable to estimate channel correlation functions by low-complexity methods.

In wireless communications, the data to be communicated is typically transmitted over a channel whose characteristics vary in time and frequency. That is to say, the amplitude and phase of the channel change from one symbol to the next and from one frequency to the next. How much the channel changes between two symbols in time does essentially depend on two things, namely the duration of a symbol and how fast the actual channel is varying, whereas how much the channel changes between two frequencies depends on how far apart the frequencies are and how frequency selective the channel is.

A common way to estimate a varying channel is to insert known symbols in the transmitted sequence, so-called pilot symbols. The pilot symbols might either be distributed as single symbols, or they might be clustered together to form short sequences of symbols. In systems based on orthogonal frequency division multiplexing (OFDM), it is commonplace to transmit scattered pilot symbols on some of the different carriers to aid in channel estimation. This is for instance the case in digital video broadcasting (DVB), where essentially 1 out of 12 transmitted symbols is a pilot. In DVB, pilots are only transmitted on every third carrier, and on those carriers every fourth symbol is a pilot.

One of the design objectives when determining how close the pilots should be in time and frequency is to get good performance without using too many pilots. That is, there should be enough pilots to allow the channel to be estimated with reasonable complexity and to cause only a small performance loss without wasting bandwidth by transmitting unnecessarily many pilots. The placement of pilots in time is essentially determined by the Nyquist sampling theorem, which implies that the channel must be sampled at a frequency at least twice the highest Doppler frequency in order to avoid aliasing. For instance, if the Doppler frequency is 50 Hz, then the channel has to be sampled at a sampling frequency, $f_S$, of 100 Hz, i.e., there must be a pilot symbol every 10 ms. If the symbol duration is, say, 1 ms, this implies that every ten symbols must be a pilot to avoid aliasing.

Just as the Nyquist sampling theorem states that, in time, there is a maximum frequency that can be handled that relates to the sampling frequency, there is an analogous result in the frequency direction, with the theorem stating that there is a maximum duration of the impulse response of the channel that can be handled that relates to the frequency difference, $f_{dist}$, between samples. This is described in F. Claessen et al., "Channel estimation units for an OFDM system suitable for mobile communication", *ITG Conf. on Mobile Radio*, Neu-Ulm, Germany (September 1995). If the duration of the impulse response of the channel is denoted $T_m$, then $T_m$ must not exceed $1/f_{dist}$ to avoid aliasing. In the context of channel estimation by interpolation, the sampling points correspond to the pilots or carriers where a channel estimate is already made.

U.S. Patent Application Publication No. US 2003/0012308 to H. Sampath et al. also describes channel estimation by receiving training symbols embedded in data symbols and an adaptive interpolator for generating data channel responses for data symbols by interpolating training channel responses. According to the publication, channel estimation may be adapted according to estimated delay spread. Various aspects of channel estimation in radio systems, including OFDM and DVB systems, are described in U.S. Pat. No. 6,381,290 to Mostafa et al.; U.S. Pat. No. 6,449,245 to Y. Ikeda et al.; and U.S. Pat. No. 6,608,863 to T. Onizawa et al.; International Patent Publication No. WO 02/23840 to R. Weber; Published European Patent Application No. EP 1 296 473 to G. Li et al.; K. Ramusubramanian et al., "An OFDM Timing Recovery Scheme with Inherent Delay-Spread Estimation", *IEEE GLOBECOM '01*, vol. 5, pp. 3111-3115 (2001); A. A. Hutter et al., "Channel Estimation for Mobile OFDM Systems", *Proc. IEEE Vehicular Technology Conf.*, vol. 1, pp. 305-309, Amsterdam, Netherlands (September 1999); and S. Y. Park et al., "Performance Analysis of Pilot Symbol Arrangement for OFDM System under Time-Varying Multi-Path Rayleigh Fading Channels", *IECE Trans. on Communications*, vol. E84-B, pp. 36-45 (January 2001).

When performing interpolation for channel estimation, one can in principle use a two-dimensional filter, i.e., operating in time and frequency simultaneously, to get optimum performance. It is, however, much more common in practice to reduce complexity by instead using a one-dimensional filter operating in either time or frequency. Alternatively, two filters can be used in a two-step process, one for interpolation in time and one for interpolation in frequency. When using a two-step approach, the order between time and frequency interpolation is a matter of design choice. Once you have decided to perform the channel estimation in a certain order, say time first and then frequency, the filters can be chosen independently of one another.

Although it in theory is possible to estimate the channel as long as the Nyquist criterion is fulfilled for the time direction and the corresponding requirement for the frequency direction holds, it requires ideal interpolation filters, which is not feasible to implement. Consequently, the pilots are located closer together in time and frequency than theoretically needed in order to allow the use of practical interpolation filters.

For interpolation in time, it will be seen that if the pilots are located such that an interpolation filter of reasonable complexity is suitable for a Doppler frequency of, say, 50 Hz, then a much simpler filter will do when the actual Doppler frequency is much smaller. That is to say, if the maximum Doppler frequency is rarely experienced, then a simpler filter will suffice most of the time, and the power consumption can be reduced by using a filter that is good enough, but not better. A less complex filter implies fewer operations, which also means that the power consumption can be reduced and that the available resources for performing calculations in a receiver can be used for something else.

As will be discussed in more detail below, a more complex interpolation filter operating in time usually also means more buffering. The reason is that the interpolation filter typically is symmetric, so that if for instance a filter of order ten is used, one has to buffer data corresponding to five pilots in order to perform the interpolation. If this kind of complex interpolation filter is needed only for the very highest Doppler frequency, it implies that in most situations one could use much less buffering.

When performing interpolation in frequency, if $T_m=1$ microsecond (μs), then it suffices to have $f_{dist}=1$ MHz, but if $T_m=100$ μs, then $f_{dist}$ must be decreased to 10 kHz. Stated otherwise, if the pilots are placed to handle the situation where $T_m=100$ μs by using a rather complex interpolation filter, then a considerably less complex filter can be used when $T_m=1$ μs. Again, a less complex filter implies fewer operations, which also means that the power consumption can be reduced and that the available resources for performing calculations in a receiver can be used for something else.

One specific case where the problem has been seen is in systems based on OFDM when the number of sub-carriers is large, like for instance in DVB. Due to the fact that the number of sub-carriers is large, the symbol duration will also be large, which means that the pilots will be further apart in time if the fraction of symbols used as pilots is kept the same, implying that interpolation becomes harder, thus requiring a more complex filter. Moreover, because the number of sub-carriers is large, the amount of data that has to be buffered per OFDM symbol will also be large. In fact in some cases where DVB has been considered, it has even been stated that because of the buffering only linear interpolation is feasible.

Consequently, there is a need to perform channel estimation using interpolation filters that are properly adjusted depending on the channel conditions. In particular, for interpolation in time, there is a need for filters that can require minimum buffering.

SUMMARY

There is a need to achieve good channel estimation without using unnecessarily complex interpolation filters. By using an interpolation filter that is tailored for the actual channel conditions, rather than using an approximation of the ideal interpolation filter, the complexity can be reduced substantially, which also reduces power consumption. In addition, by also allowing the interpolation filter to be non-symmetric, the required memory for performing the interpolation can be minimized, thus resulting in a less costly implementation.

According to one aspect, a method of adaptive interpolation filtering of a signal in a receiver includes determining at least one correlation function parameter of the channel and determining a filter configuration based on the correlation function parameter. Interpolation filtering is then performed on the signal using the determined filter configuration.

According to another aspect, an apparatus for adaptive interpolation filtering of a signal in a receiver includes logic that determines at least one correlation function parameter of the channel, logic that determines a filter configuration based on the correlation function parameter, and logic that performs interpolation filtering on the signal using the determined filter configuration.

The interpolation may be performed in the time direction, where a Doppler frequency shift can serve as the correlation function parameter, or in the frequency direction, where a root mean square (rms) delay spread can serve as the correlation function parameter, or both.

According to another aspect, a signal-to-noise ratio may also optionally be determined and used to determine the filter configuration. Alternatively, a predetermined threshold signal-to-noise ratio, below which the signal cannot be processed, may be used.

According to another aspect, the filter configuration can be determined in real time or selected from one of a plurality of predetermined configurations having different complexities.

BRIEF DESCRIPTION OF THE DRAWINGS

The several features, objects, and advantages of this invention will be understood by reading this description in conjunction with the drawings.

DETAILED DESCRIPTION

To facilitate understanding of the disclosed methods and apparatus, this description is based on an example whose data are very similar to the parameters in DVB-T, the standard for terrestrial digital video broadcasting promulgated by the European Telecommunication Standards Institute (ETSI) EN 300 744 V.1.4.1 (January 2001) Digital Video Broadcasting (DVB); Framing structure, channel coding and modulation for digital terrestrial television. To be specific, suppose that the symbol rate, $R_S$, is 1 ksymbols/second, that the distance between the different carriers is 1 kHz, that for interpolation in time every fourth symbol is a pilot, and that after interpolation has been performed in the time direction every third carrier is a pilot. Furthermore, let C/N denote the carrier-to-noise or -interference ratio, let $f_D$ denote the (maximum) Doppler frequency shift, and let $T_m$ denote the (maximum) delay spread. It will be appreciated that Applicant's invention is not limited to DVB or such parameters, but is applicable to a wide variety of communication systems.

In the case of a single-carrier system, the channel can be estimated by interpolation in time by the use of the above mentioned pilots. For a multi-carrier system like DVB-T, the channel is typically estimated by first performing interpolation in time, just as for a single-carrier system, and then a second interpolation in frequency, to estimate the channel for all carriers. Alternatively, the channel can be estimated by first performing interpolation in frequency and then in time.

If one is concerned only with interpolation in time, Applicant's invention is applicable to both single-carrier and multi-carrier systems, but as discussed above, using Applicant's invention yields greater gains in terms of required buffering for multi-carrier systems where the number of carriers is large, say more than 1000.

Generally speaking, the purpose of an interpolation filter is to reconstruct the signal between the sampling points as accurately as possible. When interpolation filtering is performed in frequency, the amplitude and phase of the carriers at frequencies in between the frequencies where the pilots are located are estimated. Even more generally, when an interpolation filter is used for channel estimation, the channel between the pilot symbols is estimated as accurately as possible. Thus, the problem of channel estimation is very much related to the design of a suitable interpolation filter.

Figure 1:
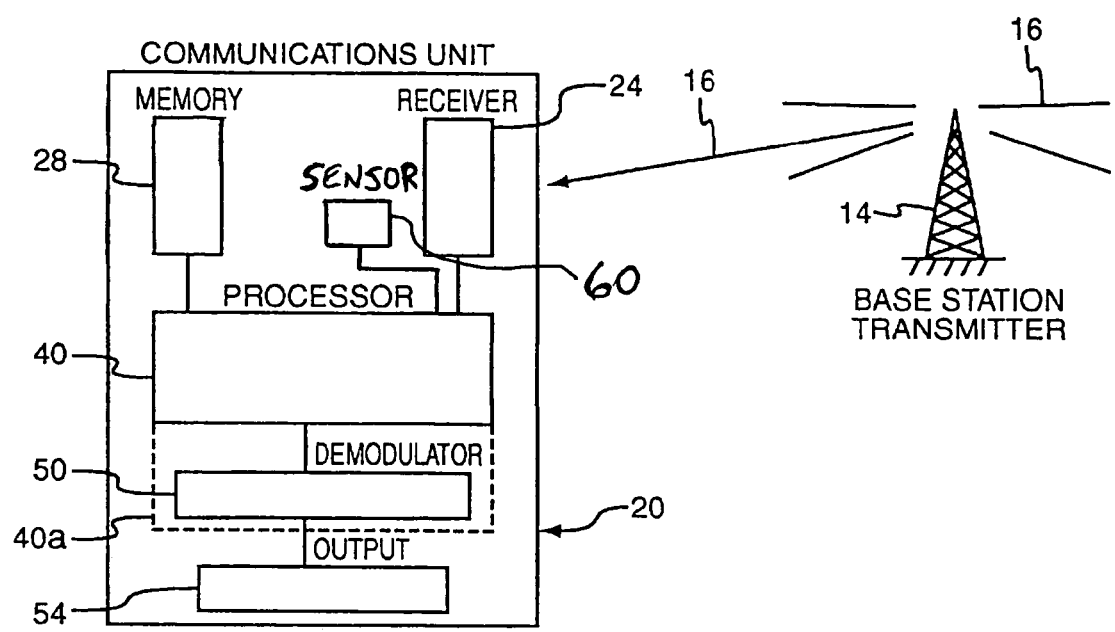
FIG. 1 depicts a communication system, including a communications unit that can implement adaptive interpolation in accordance with Applicant's invention.

Before turning to the details of Applicant's interpolation filter, a communication system in which such a filter can be used is described that is based on U.S. Pat. No. 6,381,290, which is cited above and which is incorporated here by reference. As illustrated in FIG. 1, a transmitter 14 broadcasts signals 16 that include pilot and other symbols to a communications unit 20. The communications unit 20 compares received pilot symbols with the known symbols and determines appropriate factors for correcting for signal degradation of the pilots. These factors are then used to determine appropriate correction factors for all symbols by suitable interpolation. In general, the communications unit 20 includes a receiver 24 and a memory 28 that stores information regarding the pilot symbols and, as described below, a number of interpolation filters. The communications unit 20 also includes a suitable processor 40 for interpolating based on the received pilots using an interpolation filter function, and appropriate received symbols are demodulated based on the interpolated channel estimate by a demodulator 50 that provides an output signal at an output 54. The demodulator 50 may be a part of or implemented by the processor 40, with the processor 40 doing the demodulation, as indicated by the dashed lines 40a, or the demodulator may be separate from the processor. It will be appreciated that data symbols are typically protected by some combination of error correction coding and error detection coding, and the unit 20 includes suitable devices and/or programming to handle such coding.

As described below, the information on the interpolation filters stored in the memory 28 may comprise suitable program steps, mathematical expressions, algorithms, or the like that enable the processor 40 to apply the desired filtering to received symbols. The information selected in a particular situation may depend on the relative speed of the transmitter and communications unit, and thus the unit 20 also includes a suitable sensor 60 for determining such conditions.

The Doppler spread, which depends on the relative speed of the transmitter and communications unit, can be estimated using, for example, the level crossing rate method and/or the zero crossing rate method. The level crossing rate method considers the absolute value of the channel response and counts the number of times, during a given time interval, the absolute value crosses a given level. The zero crossing rate method considers either the real or imaginary part of the channel response and counts the number of times, during a given time interval, the real or imaginary part crosses zero.

In addition, it will be understood by those of skill in the art that algorithms for developing Wiener filters, for example, are disclosed in W. Kuo et al., "Designs for Pilot-Symbol-Assisted Burst-Mode Communications with Fading and Frequency Uncertainty", *Int'l J. of Wireless Information Networks*, vol. 1, no. 4, pp. 239-252 (1994).

Returning now to Applicant's designs for suitable interpolation filters, one approach is to base the channel estimation on an ideal interpolation filter both in time and frequency. In the time direction, the ideal filter is then given by the formula:

$$x_r(t) = \sum_{n=-\infty}^{\infty} x[n] \frac{\sin(\pi - nT)/T}{\pi(t-nT)/T}, \tag{1}$$

where $x_r(t)$ is the reconstructed signal, T is the duration between the samples used for interpolation, and x[n] are the samples used for interpolation. Such filters are described in A. V. Oppenheim and R. W. Scharf, *Discrete-Time Signal Processing*, Prentice-Hall (1989). The filter described by Eq. (1) is referred to as the ideal reconstruction filter, or the ideal interpolation filter, in that it can perfectly reconstruct a signal that is strictly band-limited to |f|<1/2T. In case the frequency f is not restricted to this range, then it is not possible to perfectly reconstruct the signal.

If every fourth symbol is a pilot, it follows that the time between the pilots is 4 ms, so that the highest Doppler frequency that can be handled in order to give perfect channel estimation in case of a noiseless situation is 125 Hz. Now, the ideal reconstruction filter is not realizable, so that in a practical implementation, the filter is typically truncated to a filter length that is feasible to implement and gives a reasonable implementation loss.

Considering interpolation in frequency for a moment, where every third carrier frequency is a (possibly estimated) pilot, it follows that the frequency separation between the pilots is 3 kHz, so that the longest duration of the impulse response of the channel, $T_m$, to give perfect channel estimation in case an ideal interpolation filter was employed is 333 Us.

The figure of merit used to determine the performance of the interpolation filter in either time or frequency is the SNR, which is defined as the power of the actual channel normalized by the squared error of the channel estimates, i.e.:

$$SNR = \frac{E[|h_k|^2]}{E[|\hat{h}_k - h_k|^2]}. \quad (2)$$

where $h_k$ is the actual channel response and $\hat{h}_k$ is the channel response estimate. In Eq. (2), the error in the estimation of the channel can be due to both noise and imperfections in the interpolation filter. That is to say, if the interpolation would be ideal, the SNR would be the same as the SNR on the channel, which hereinafter will be denoted C/N, but realistically SNR<C/N, and the discrepancy C/N−SNR is the loss caused by the interpolation filter.

To optimize the performance of an interpolation filter, a correlation function of the channel is needed as well as the C/N. For interpolation in time, the correlation function can be assumed to depend on one parameter only, the Doppler frequency $f_D$, as will be discussed further below. The reason for this is that certain assumptions, which have been verified by practical measurements, can be made for the channel. For interpolation in frequency, an approximated correlation function is used that works for different delay profiles, and that only depends on one parameter, as is discussed further below. That is, there are two interpolation filters described herein, and each can be adapted completely independent of one another.

Since an interpolation filter is a low-pass filter, one approach to obtaining an interpolation filter is to use a fixed low-pass filter irrespective of the channel properties, such as $f_D$ and C/N. As discussed above, however, an interpolation filter should take the correlation function of the channel and C/N into account to improve performance. Interpolation filters that consider $f_D$ and C/N are generally described in B. Lindoff et al., "Channel estimation for the W-CDMA system, performance and robustness analysis from a terminal perspective", *Proc. 49th IEEE Vehicular Technology Conf.*, pp. 1565-69 Houston, Tex., USA (May 1999), where the interpolation is based on a Wiener filter approach. In order to find the Wiener solution, one must know both $f_D$ and C/N. To be specific, it has been verified that the correlation function $r(\tau)$ of a mobile channel in many situations can be assumed to take the form:

$$r(\tau) = J_0(2\pi F_D |\tau|), \quad (3)$$

where $J_0(.)$ is a Bessel function of the first kind and T is the time difference between two channel samples. This is described in W. C. Jakes, ed., *Microwave Mobile Communications*, IEEE Press (1974).

By letting $T_P$ denote the time between the pilot symbols, i.e., 4 ms, since every fourth symbol in the example is a pilot, and M denote the order of the interpolation filter, a correlation matrix R of the channel can be written as:

$$R = \begin{bmatrix} r(0) + \frac{1}{C/N} & r(T_p) & \cdots & r((M-1)T_p) \\ r(T_p) & r(0) + \frac{1}{C/N} & \cdots & r((M-2)T_p) \\ \vdots & \vdots & \ddots & \vdots \\ r((M-1)T_p) & r((M-2)T_p) & \cdots & r(0) + \frac{1}{C/N} \end{bmatrix}. \quad (4)$$

Moreover, the cross-correlation vector $r_1$, in a case where the sample for which the channel is to be estimated is located one sample to the right of the closest pilot, is given by:

$$r_1 = [r((M/2-3/4)T_p) \ldots, r((1/4)T_p), r((3/4)T_p), \ldots, r((M/2-1/4)T_p)]^T, \quad (5)$$

and if the sample is located in the middle of two pilot symbols, the cross-correlation vector $r_2$ is given by:

$$r_2 = [r((M/2-1/2)T_p) \ldots, r((1/2)T_p), r((1/2)T_p), \ldots, r((M/2-1/2)T_p)]^T, \quad (6)$$

The corresponding Wiener filter is then given by:

$$w_i = R^{-1} r_i, i=1, 2, \quad (7)$$

and the interpolation filter can then be created by combining the two Wiener filters corresponding to the two cross-correlation vectors above. (The case when the sample is located one sample to the left of the closest pilot is similar because of symmetry to the case when the sample is located one sample to the right of the closest pilot.)

Figure 2:
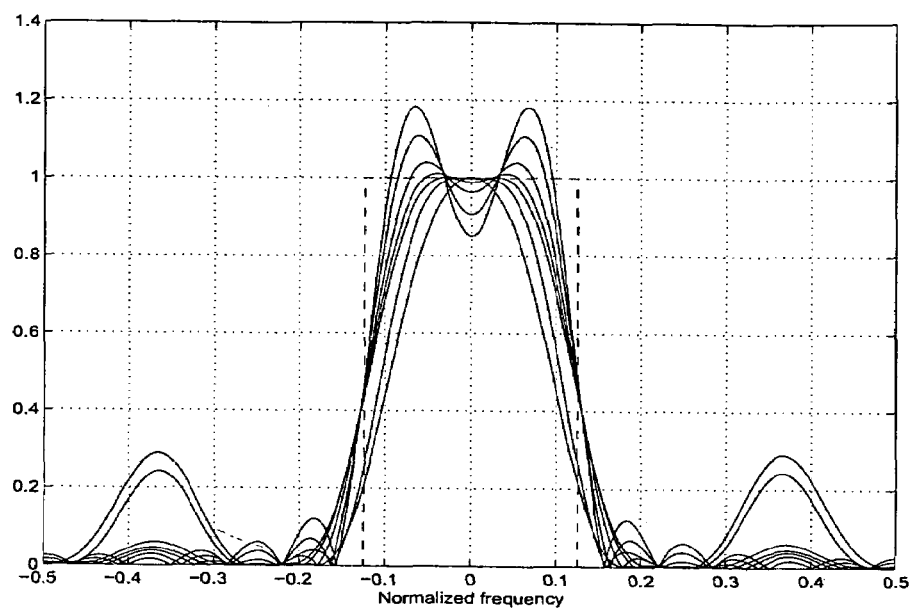
FIG. 2 depicts an amplitude function of an interpolation filter with M=4 designed for $f_D$=10, 20, 40, 60, 80, 100, and 120 Hz and C/N=40 dB.
Figure 3:
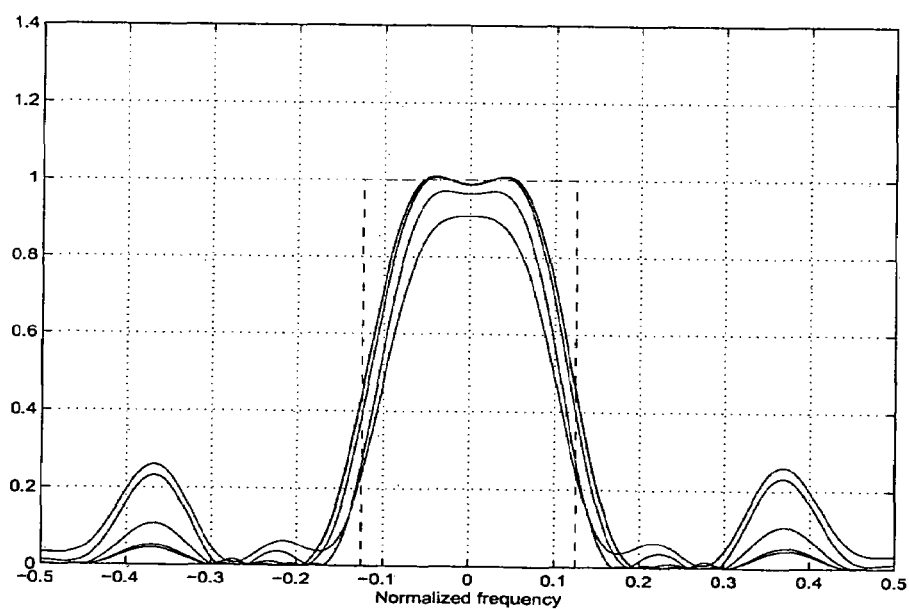
FIG. 3 depicts an amplitude function of an interpolation filter with M=4 designed for SNR=5, 10, 20, 30, and 40 dB and $f_D$=60 Hz.

To see how $f_D$ and C/N affect the resulting interpolation filter when performing interpolation in time, consider FIGS. 2 and 3, which show the amplitude function versus normalized frequency of a Wiener interpolation filter having complexity M=4, where M is the order of the filter, i.e., the number of pilots that are used when performing the interpolation. FIG. 2 shows the amplitude for C/N=40 dB and Doppler frequency shifts $f_D$ of 10, 20, 40, 60, 80, 100, and 120 Hz, and FIG. 3 shows the amplitude for $f_D$=60 Hz and SNRs of 5, 10, 20, 30, and 40 dB. From FIG. 2, it can be seen that the filter function is quite sensitive to the value of $f_D$. Specifically, if the filter is designed for a Doppler frequency that is smaller than the actual one, then there will be a significant discrepancy between the obtained filter and the ideal one. From FIG. 3, on the other hand, it can be concluded that for SNRs in the range of 10 dB and more, the Wiener solution is only marginally affected.

Figure 4:
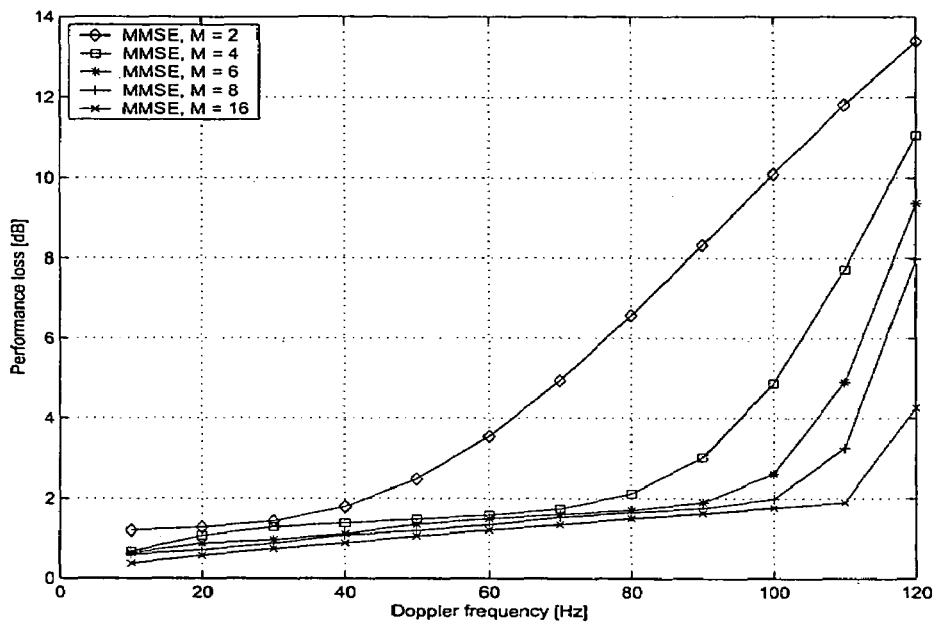
FIG. 4 depicts performance loss for some different Wiener filters as a function of Doppler frequency and C/N=20 dB.

To find out how well the Wiener filter performs for different complexities, the loss C/N−SNR is plotted as a function of $f_D$ for complexities of 2, 4, 6, 8, and 16 in FIG. 4, which shows that an interpolation filter of order two, i.e., M=2, results in a significant loss (>3 dB) when $f_D$ exceeds, say, 60 Hz. It can also be seen that for $f_D$<80 Hz, the gain that is obtained by increasing the complexity M from 4 to 16 is, in spite of the complexity increase, minimal, i.e., only a few tenths of a dB.

Figure 5:
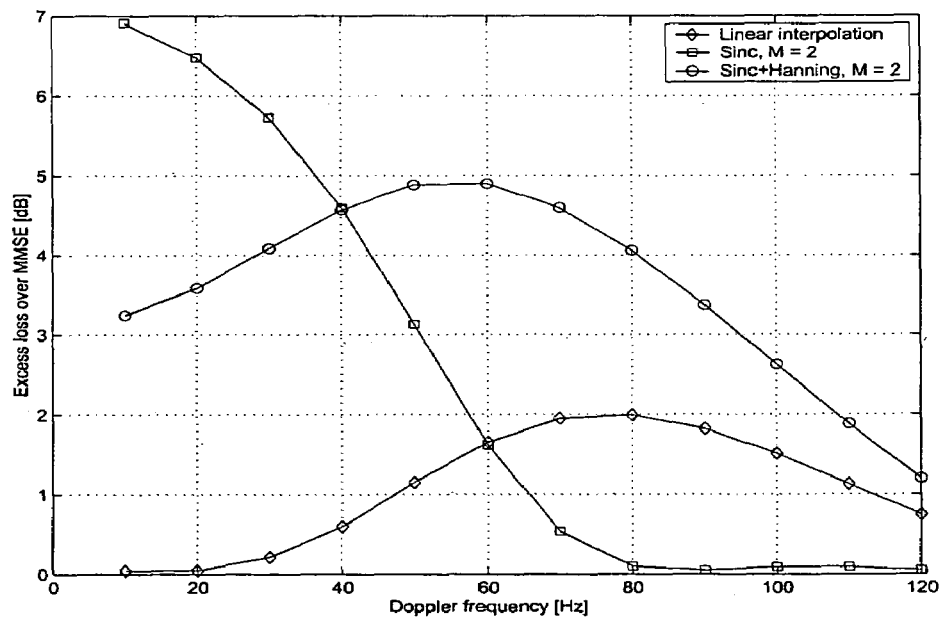
FIG. 5 depicts excess loss for different Wiener filters as a function of Doppler frequency for C/N=20 dB.
Figure 6:
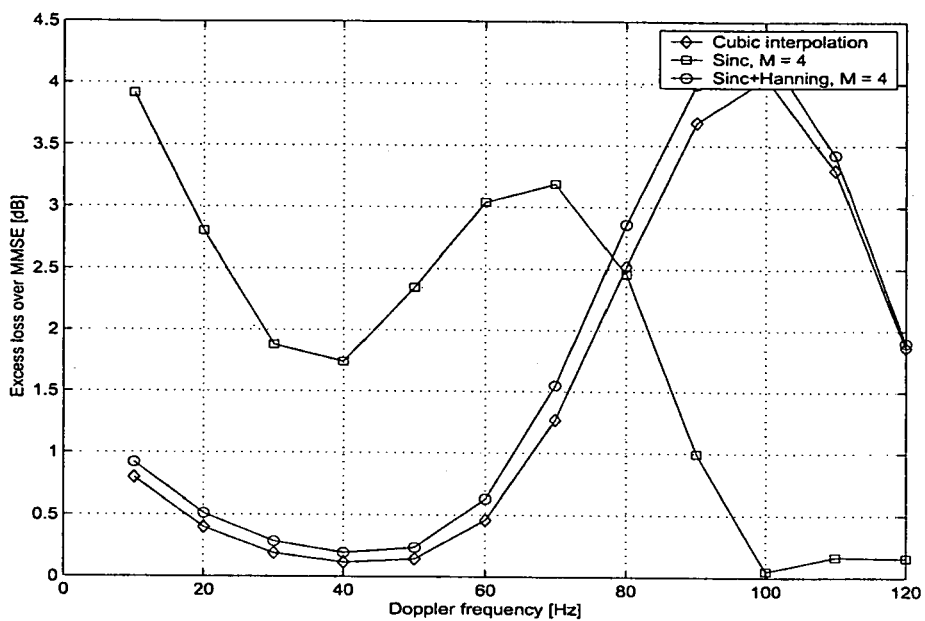
FIG. 6 depicts excess loss for different Wiener filters as a function of Doppler frequency for C/N=20 dB.
Figure 7:
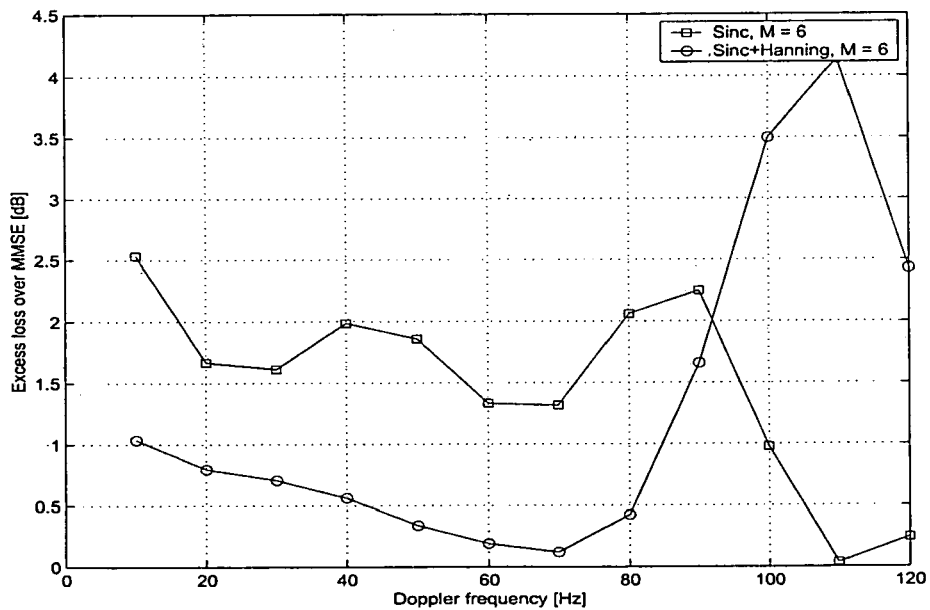
FIG. 7 depicts excess loss for different Wiener filters as a function of Doppler frequency for C/N=20 dB.
Figure 8:
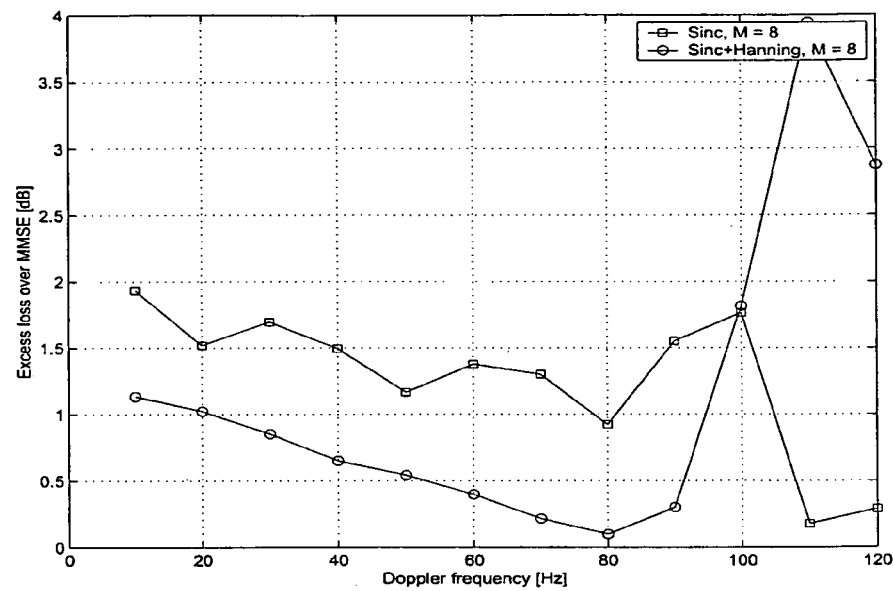
FIG. 8 depicts excess loss for different Wiener filters as a function of Doppler frequency for C/N=20 dB.
Figure 9:
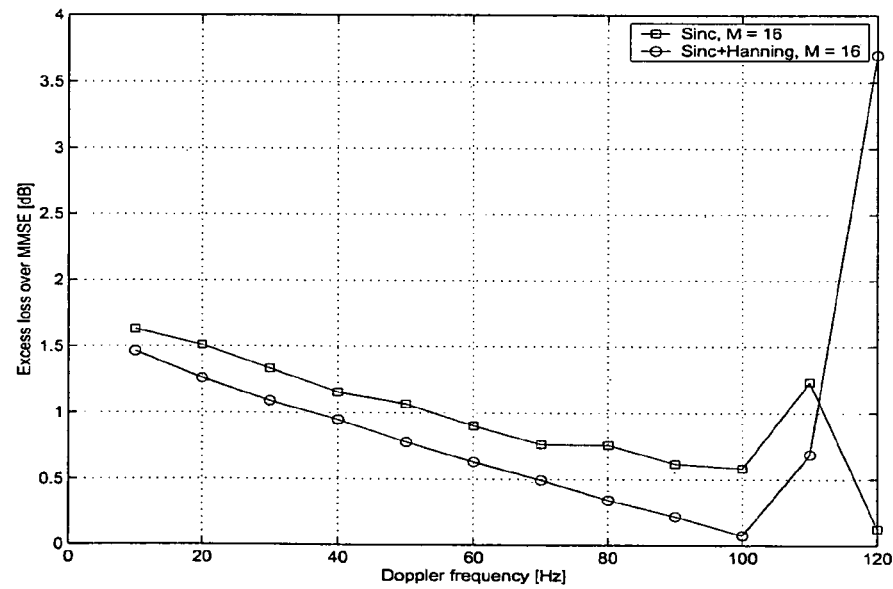
FIG. 9 depicts excess loss for different Wiener filters as a function of Doppler frequency for C/N=20 dB.

If the interpolation filter is fixed, i.e., is not changed as $f_D$ varies, an excess loss compared to the Wiener filter is experienced. As described below, a Wiener filter results in that the estimation/interpolation error is minimum in the mean-square-error sense (MMSE). The excess loss in dB versus Doppler frequency shift is shown for C/N=20 dB and complexities of 2, 4, 6, 8, and 16 of the interpolation filter in FIGS. 5-9, respectively. FIG. 5 shows the performance of a linear interpolation filter, a truncated sinc filter, and a truncated sinc filter with a Hanning window. FIG. 6 shows the performance of a cubic interpolation filter, a truncated sinc filter, and a truncated sinc filter with a Hanning window. FIGS. 7-9 each show the performance of a truncated sinc filter and a truncated sinc filter with a Hanning window. It can be seen that for all the fixed filters the maximum loss is significant.

Figure 10:
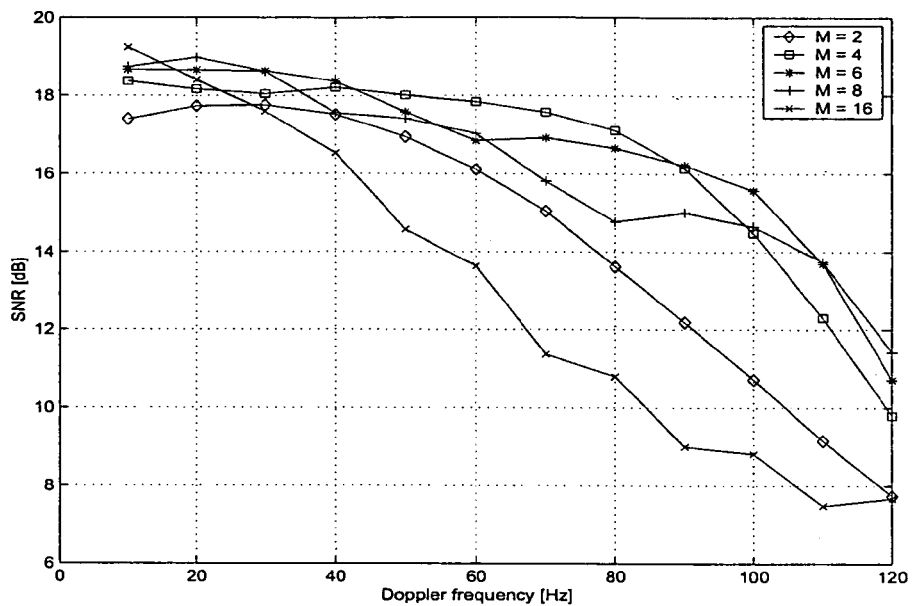
FIG. 10 depicts SNR as a function of $f_D$ for different Wiener filters designed for 80% of $f_D$ and C/N=20 dB.
Figure 11:
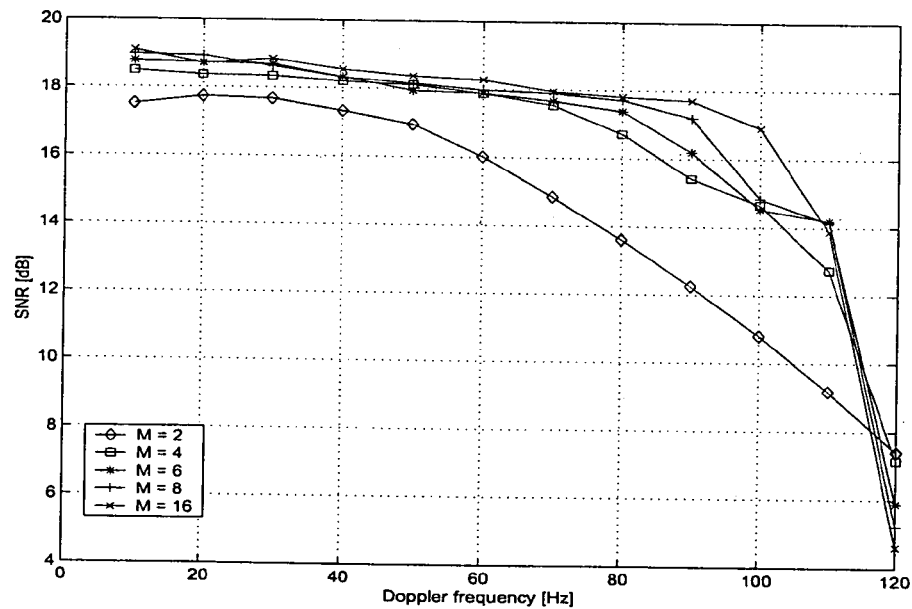
FIG. 11 depicts SNR as a function of $f_D$ for different Wiener filters designed for 120% of $f_D$ and C/N=20 dB.

With the robustness of Wiener filters with respect to SNR and the excess loss of fixed filters with respect to Wiener filters, Applicant has recognized that estimating $f_D$ and optimizing a Wiener filter based on this estimate and the worst SNR where a system might operate is feasible, as well as using an estimated C/N or a predetermined operating point of the SNR instead of the worst SNR where a system might operate. In particular one could estimate the Doppler frequency shift, and then use an interpolation filter based on the appropriate Wiener solution given by Eq. (7). To reduce the computational effort, one can advantageously calculate the optimum interpolation filter for only a relatively small number of values of $f_D$, say five, because a Wiener filter designed for a Doppler frequency that is somewhat larger than the actual Doppler will perform almost as well as a filter designed for the actual Doppler, keeping in mind that the excess loss is substantial when the filter is designed for a Doppler frequency that is lower than the actual one, as shown in FIGS. 10 and 11. This is also consistent with what was seen in FIG. 2. FIGS. 10 and 11 show SNR in dB versus Doppler frequency shift in Hz for filter complexities of 2, 4, 6, 8, and 16 and C/N=20 dB. In FIG. 10, the filters are optimized for 80% of the Doppler shift value, and in FIG. 11, the filters are optimized for 120% of the Doppler shift value.

Up to this point, two things should be understood. First, there is a substantial performance gain to be made if an interpolation filter operating in time can be designed for a given value of $f_D$. Second, there is a substantial complexity gain (which translates into power consumption savings) if a "good-enough" filter is chosen for a given $f_D$, rather than using a fixed filter that by necessity has to be designed for the worst-case Doppler frequency.

Nevertheless, even if the complexity issue is addressed with a variable length interpolation filter, the memory requirement is not. Specifically, an interpolation filter is typically symmetric, since this gives the best performance for a given complexity. Assuming the filter order to be even, which often is the case; this implies that the channel at a certain time instant cannot be estimated until M/2 pilots coming later in time have been received. That is to say, the number of symbols that must be buffered grows linearly with M, and can for, say, M>4 (or even M>2) become prohibitively large in the case of OFDM systems. Since in the case of symmetric filters, the memory consumption is determined by the filter with the highest complexity, this means that when a low complexity filter is used, a significant part of the memory is useless.

In order to limit the required memory, Applicants have recognized that it is possible to use non-symmetric filters. That is to say, to perform the channel estimation, more old pilots and fewer future pilots are used. Since a symmetric filter is optimal from a performance point of view, this implies that the order for a non-symmetric filter might be higher than for a symmetric one to give acceptable performance. Nevertheless, the memory consumption can be kept low. Therefore, if the most complex filter is used for only a small fraction of time, i.e., when the Doppler frequency is high, using non-symmetric filters allows for an implementation that does not require unnecessary memory, and also allows for a close to optimal average power consumption.

Figure 12:
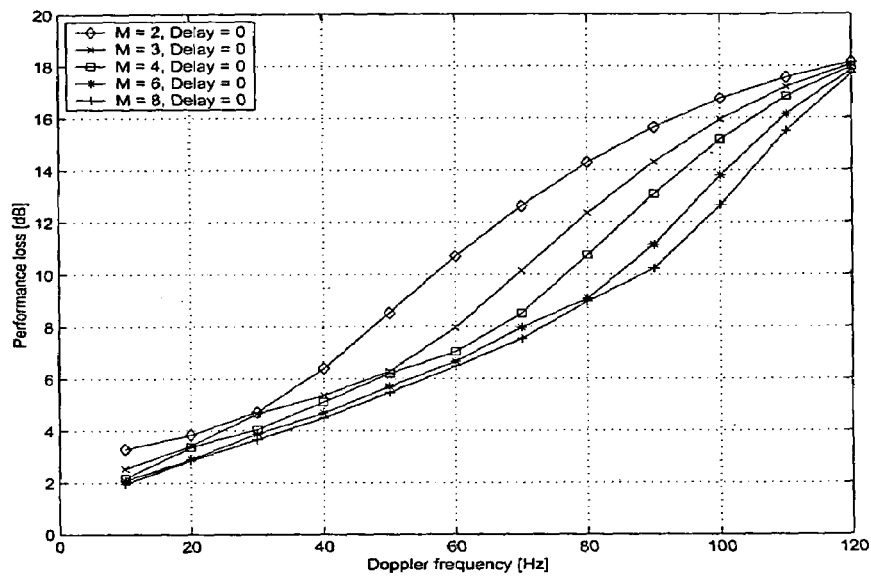
FIG. 12 depicts performance loss for different non-symmetric Wiener filters as a function of Doppler frequency with delay=0 and C/N=20 dB
Figure 13:
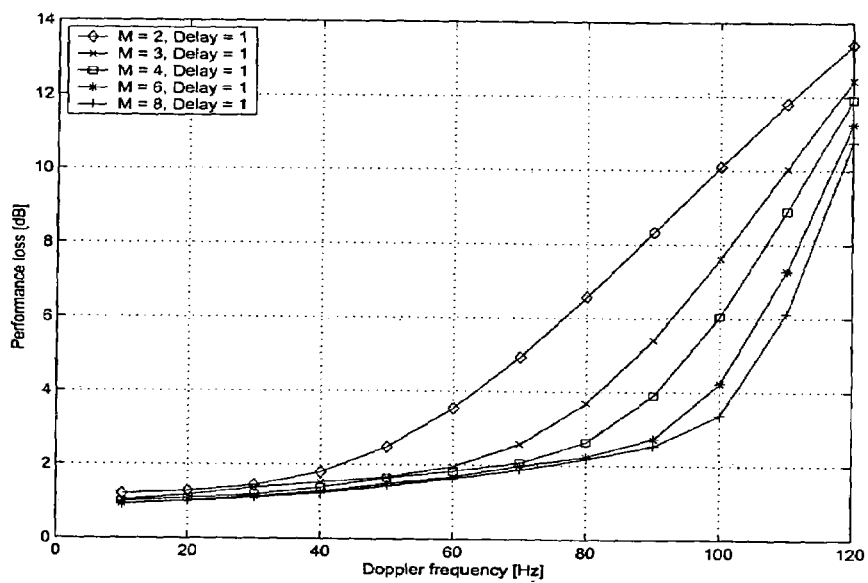
FIG. 13 depicts performance loss for different non-symmetric Wiener filters as a function of Doppler frequency with delay=1 and C/N=20 dB
Figure 14:
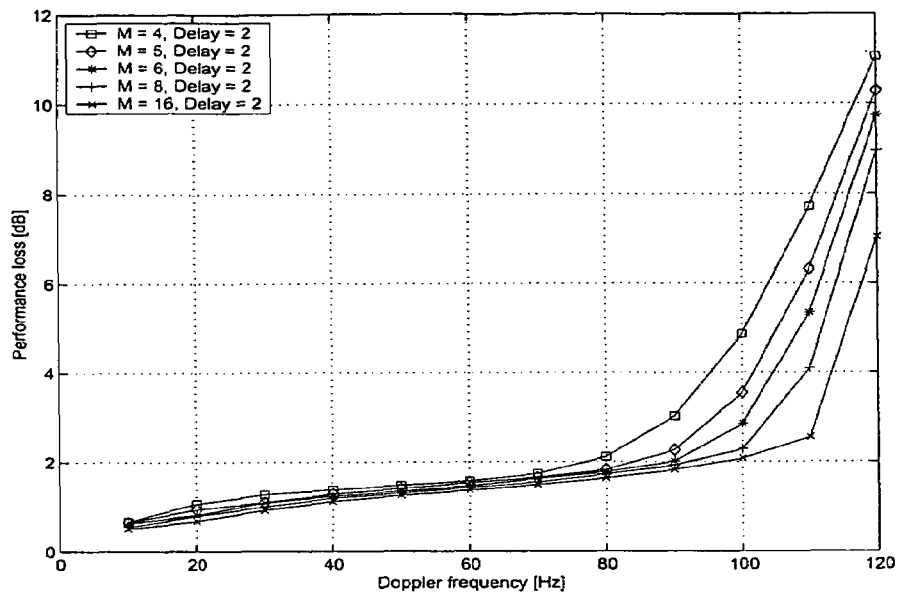
FIG. 14 depicts performance loss for different non-symmetric Wiener filters as a function of Doppler frequency with delay=2 and C/N=20 dB
Figure 15:
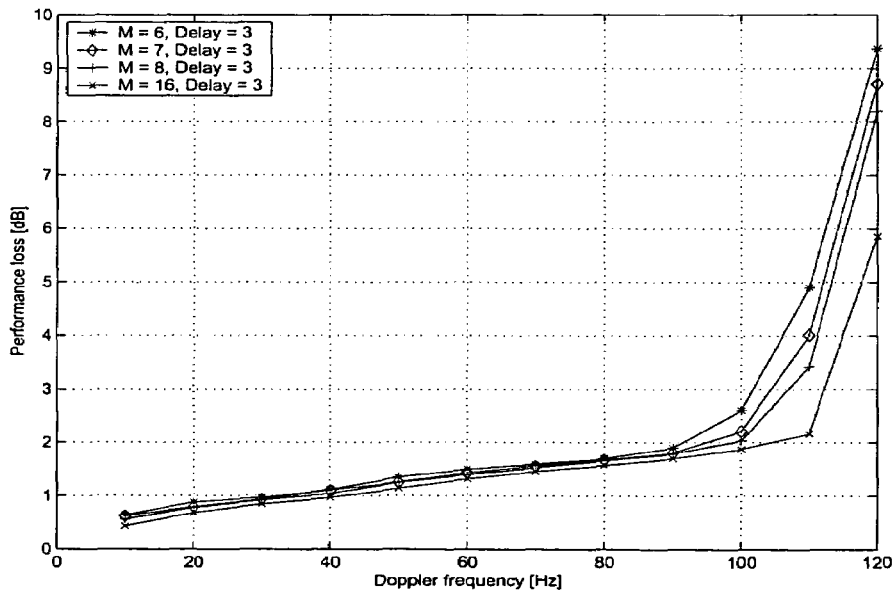
FIG. 15 depicts performance loss for different non-symmetric Wiener filters as a function of Doppler frequency with delay=3 and C/N=20 dB.

In what follows, the interpolation filters used for channel estimation are characterized by two parameters. In addition to the order of the filter, M, there is also given the corresponding delay that indicates how much buffering is needed. For a symmetric filter, the delay equals M/2, and if the channel estimation is based on pure prediction, the delay is zero. To see how the performance depends on M when the delay is fixed, consider FIGS. 12-15, which show performance loss in dB versus Doppler frequency shift in Hz for C/N=20 dB. FIGS. 12 and 13 show filters having complexities of 2, 3, 4, 6, and 8 and delays of 0 and 1, respectively. FIG. 14 shows filters having complexities of 4, 5, 6, 8, and 16 and delays of 2. FIG. 15 shows filters having complexities of 6, 7, 8, and 16 and delays of 3. It is interesting to see how the performance can be improved by increasing M but keeping the delay fixed, since this corresponds to the situation where the required memory is fully used, but the most complex filters are used only when needed.

As an example, suppose that C/N=20 dB and the loss due to channel estimation should not exceed 4 dB for Doppler frequencies below 100 Hz. Then, if the channel estimation is based on a truncated ideal interpolation filter, the minimum filter length is M=8 with a delay corresponding to 4, as depicted in FIGS. 4 and 8. If instead the channel estimation is based on a symmetric Wiener filter, it suffices to use a filter of order M=6 with a delay corresponding to 3, as depicted in FIG. 15. Finally, if a non-symmetric filter is used, a filter with M=8 and a delay corresponding to 1 is sufficient, as depicted in FIG. 12, and a substantial reduction of the required memory is achieved. In addition, although M is larger for the non-symmetric filter when $f_D$=100 Hz, it can be readily seen that the complexity can be reduced considerably if only the Doppler shift is reduced somewhat. For instance, at a Doppler shift of 80 Hz, M=3 gives a loss that is less than 4 dB in FIG. 13.

Turning from interpolation in time to interpolation in frequency, the performance of the interpolation filter operating in frequency can be improved by basing the filter on both the correlation function of the channel and C/N. Filters interpolating in frequency are generally described in P. Frenger et al., "Decision-directed coherent detection of multicarrier systems on Rayleigh fading channels", *IEEE Trans. Vehicular Technology*, vol. 48, pp. 490-498 (Mar. 1999), where the interpolation is based on a Wiener filter approach.

As for the filters for interpolation in time, one must know both the correlation function of the channel and C/N in order to find the Wiener solution. For a uniform delay profile, the correlation function r(Δf) of the channel is given by:

$$r(\Delta f) = \frac{\sin(\pi T_m \Delta f)}{\pi T_m \Delta f} e^{-j\pi T_m \Delta f}, \quad (8)$$

and for an exponential delay profile, the correlation function of the channel is given by:

$$r(\Delta f) = \frac{1}{1 + j2\pi \Delta f T_{rms}}, \quad (9)$$

where $T_{rms}$ is the root mean square (rms) delay spread.

Figure 16:
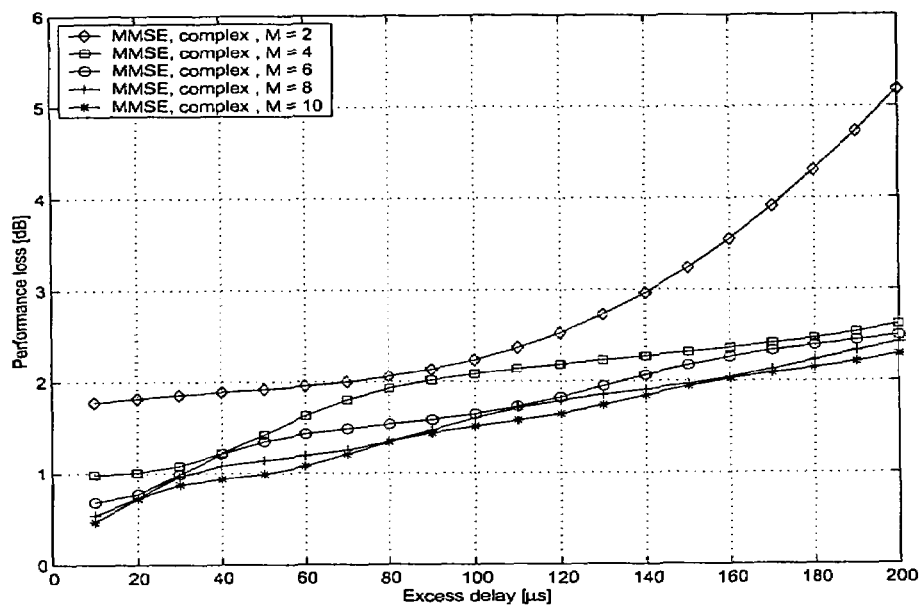
FIG. 16 depicts performance loss for different complex Wiener filters as a function of excess delay, with C/N=20 dB.
Figure 17:
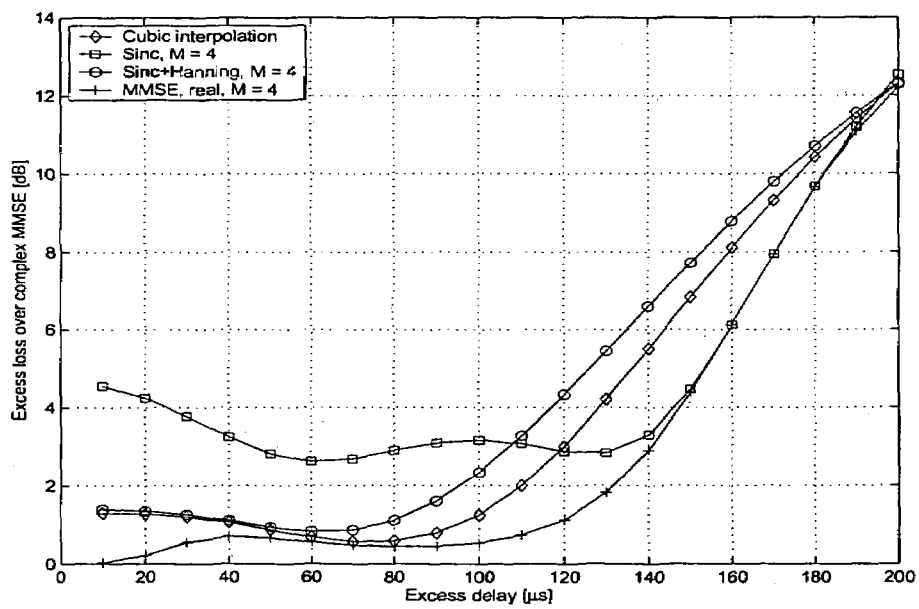
FIG. 17 depicts excess loss for different filters with M=4 as a function of excess delay, with C/N=20 dB.

The performance loss caused by interpolation filters of different complexities is depicted in FIG. 16, which shows the loss in dB versus excess delay in microseconds (μs) for complex-valued Wiener filters having complexities of 2, 4, 6, 8, and 10. If instead of a Wiener filter, a sub-optimal filter is used for interpolation, there is an excess loss over that obtained for the MMSE filter. FIG. 17 shows this excess loss in dB versus excess delay in us for four different sub-optimal filters having M=4 with C/N=20 dB. Three of the depicted sub-optimal filters are fixed filters, i.e., they remain the same independent of the channel conditions. These are a cubic interpolation filter, a truncated sinc filter, and a truncated sinc filter with a Hanning window. The fourth filter depicted is a real-valued Wiener (MMSE) filter, which is derived by simply discarding the imaginary part of the correlation function.

FIG. 17 depicts the excess loss for filters of rather low complexity, i.e., only four taps. It is noteworthy that for large values of excess delay, the excess loss increases drastically because in case of a real-valued interpolation filter, the maximum delay spread that can be handled is $1/2f_{dist}$, rather than $1/f_{dist}$, which is the case for the complex filter. Thus, as $T_m$ approaches $1/2 \cdot 3000 = 167$ μs, it is impossible for a real filter to work properly.

Thus, the correlation function in the frequency direction will depend on what the actual profile looks like. Rather than directly estimating the correlation function, the preferred way to find the correlation function is to estimate what the impulse response of the channel looks like. In a system based on OFDM, this is conveniently done at the receiver side by using the inverse FFT, as described in, e.g., "*Optimal Receiver Design for OFDM-Based Broadband Transmission—Part II. A Case Study,*" IEEE Trans on Communications, by M. Speth, S. Fechtel, G. Flock, and H. Meyr pp. 571-578, April 2001. Once the impulse response of the channel is estimated, it is possible to determine if the channel should be considered to be exponentially decaying or uniform, and then the proper parameter, i.e., $T_{rms}$, or $T_m$ can be estimated.

As with filters in the time direction, Applicant has recognized that there is a substantial performance gain to be made if the interpolation filter can be designed for a given value of $T_m$. Applicant has also recognized that there is a substantial complexity gain (which translates into power consumption savings) if a "good-enough" filter is chosen for a given delay spread, rather than using a fixed filter that by necessity has to be designed for the worst-case delay spread.

Those of skill in the art will understand that Applicant's techniques enable interpolation in frequency with performance close to that obtained with an ideal Wiener filter, but without explicitly estimating the correlation function of the channel. This is accomplished by using an approximation of the correlation function that can depend on either of the RMS delay spread, $T_{rms}$, or the maximum delay spread, $T_m$, of the channel, whichever is found most suitable. The value of C/N, which is also needed in order to find the Wiener filter, can be taken to be the smallest one where the system is expected to operate properly, or it can be estimated from actual conditions.

Figure 18:
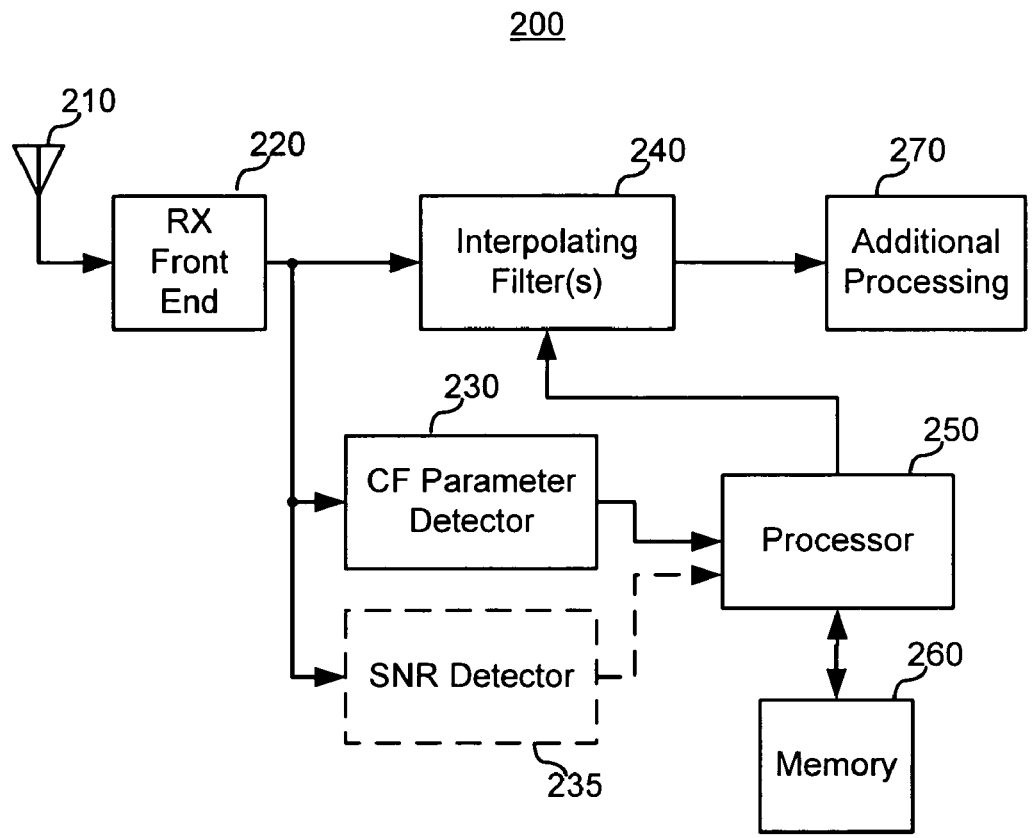
FIG. 18 is a block diagram depicting an apparatus for adaptive interpolation filtering according to an aspect.

According to an aspect of the invention, depicted in FIG. 18, an apparatus 200 for adaptive interpolation filtering includes a processor 250, one or more interpolating filters 240, a memory 260, a correlation function parameter detector 230, and, optionally, a signal-to-noise ratio detector 235 (shown dashed to represent an optional block). When a signal is received via an antenna 210 and processed at a receiver front end 220, the signal is provided to one or more interpolating filters 240 for channel estimation and then receives additional processing not discussed here. The signal is also provided to a correlation function parameter detector 230, and optionally to a signal-to-noise ratio detector 235. The operation of the apparatus, in various configurations, is discussed further below in connection with the methods of FIGS. 20-23. It will be understood that the block diagram of FIG. 18 includes logical blocks that can be realized in many forms to perform the needed functions. This corresponding functionality is represented in the appended claims by the term "logic that," the meaning of which is discussed further below.

Figure 19:
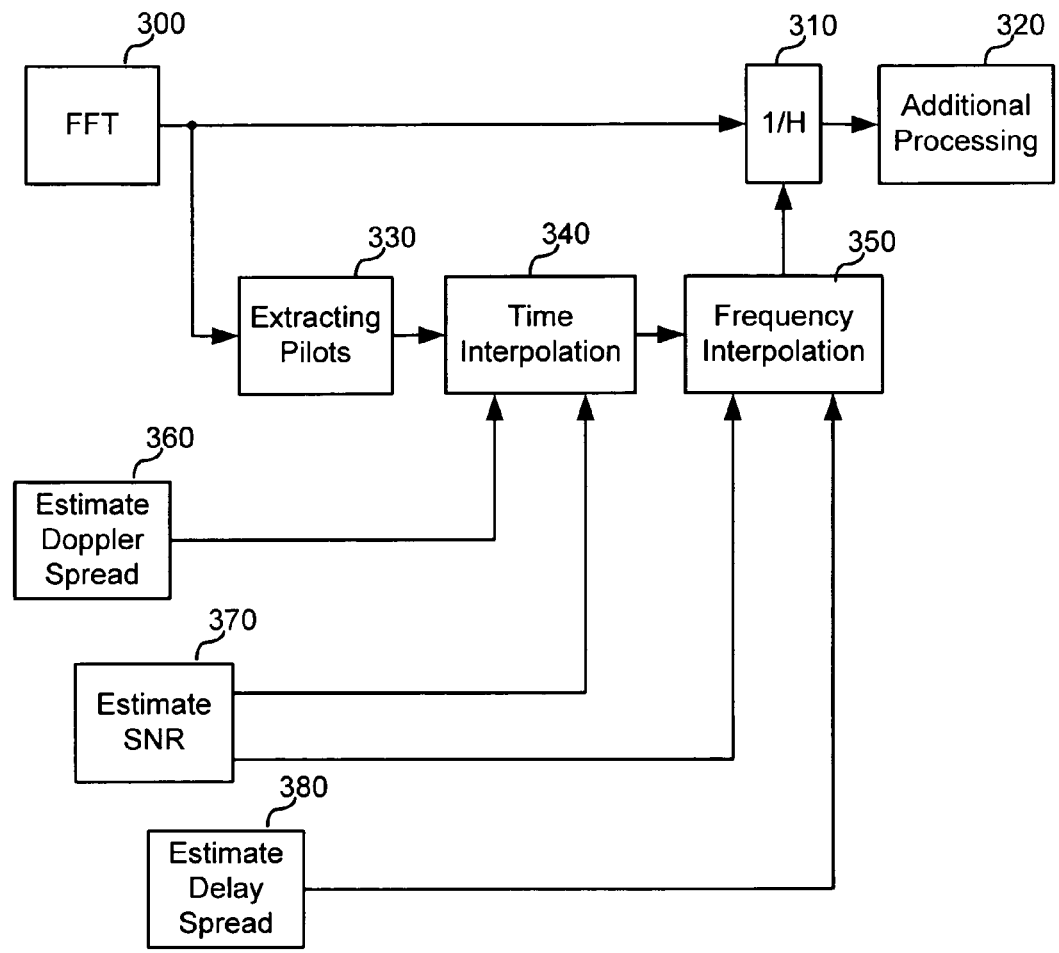
FIG. 19 is a block diagram depicting an apparatus for adaptive interpolation filtering according to another aspect

In FIG. 19, an apparatus for adaptive interpolation filtering is logically shown, which can be used, for example, in an OFDM system. A fast fourier transform (FFT) circuit 300 received the baseband signal and performs an FFT on the signal to demodulate the OFDM signal. Each of the samples of the OFDM signal output from the FFT circuit 300 is supplied to a dividing circuit 310 and a pilot signal extracting circuit 330. The pilot signal extracting circuit 330 extracts the pilot signal from the input signal and outputs it to a time interpolating filter 340. The time interpolating filter 340 performs interpolation in time on the input pilot signal, and provides the results to a frequency interpolating filter 350. The frequency interpolating filter 350 performs interpolation in frequency on the signal. Here, it should be again stated that the order of interpolation can be reversed and that only one interpolation can be performed instead of both. Respective parameters are provided to the filters for the correlation function. For example, the estimated Doppler spread 360 and SNR estimate 370 are provided to the time filter 340, while the estimated delay spread 380 and SNR estimate 370 are provided to the frequency filter 350. The transmission path characteristics are thereby estimated for each of the carrier waves of the OFDM signal, and the estimation result is output to the dividing circuit 310. The dividing circuit 310 divides each of the carrier waves of the OFDM signal input from the FFT circuit 300 by the transmission path characteristics input from the filters 340 and/or 350, removes the distortion occurred in the transmission path, and outputs a resultant for further processing 320.

Figure 20:
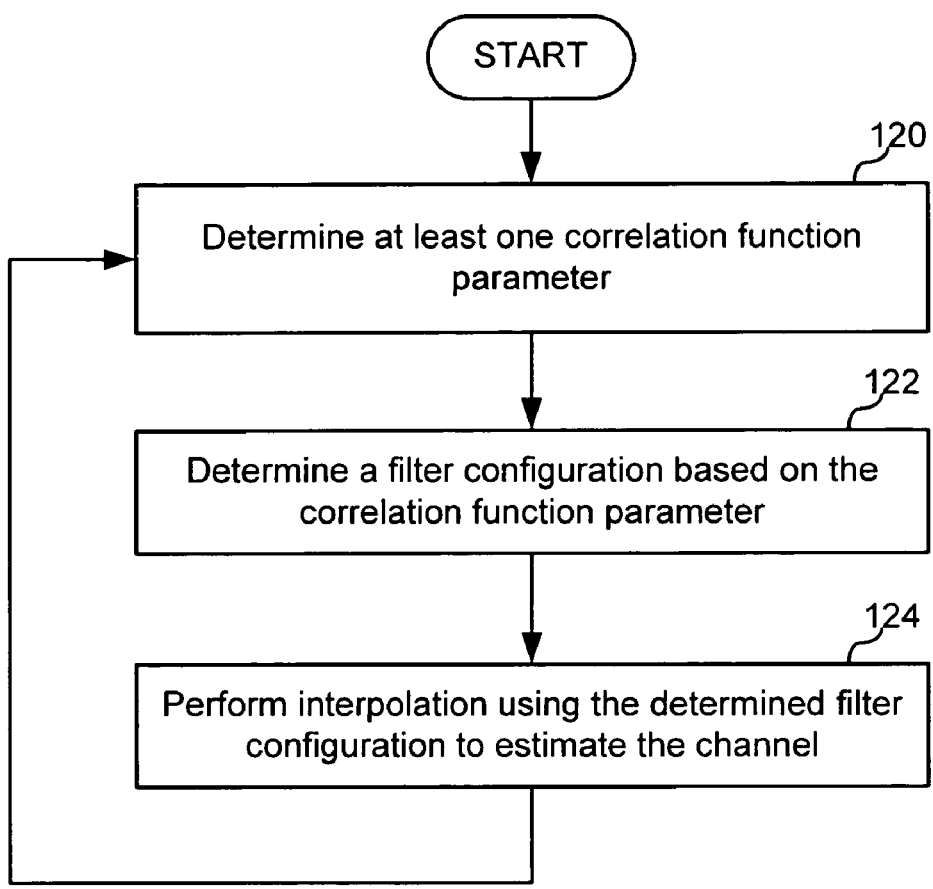
FIG. 20 is a flowchart of a method for adaptive interpolation filtering according to one aspect.

A method for adaptive interpolation filtering according to another aspect of the invention is depicted in FIG. 20. Whether the filter 240 interpolates in time or frequency, at least one correlation function parameter of the correlation function for the channel is determined (120) by the correlation function parameter detector 230 in conjunction with the processor 250. Here, when the filter 240 is interpolating in time, the Doppler frequency shift, $f_D$, is determined. When the filter 240 is interpolating in frequency, the RMS delay spread, $T_{rms}$, or the maximum delay spread, $T_m$, of the channel, whichever is found most suitable, is determined. A filter configuration is determined (122) by the processor 250 based on the correlation function parameter. Here, the filter configuration may be calculated in real time or may be selected from a set of filter configurations that are pre-programmed, or pre-stored, in memory 260 or built in hardware (not shown), which are all denoted hereinafter by the term "pre-computed". When the filter 240 is interpolating in time, the filter configuration is computed in the processor 250, and when the filter 240 is interpolating in frequency, the filter configuration is computed in the processor 250, as described above. Interpolation is then performed (124) on the signal by the filter 240 using the determined filter configuration to estimate the channel. The method repeats to update the filter configuration, e.g., periodically.

Figure 21:
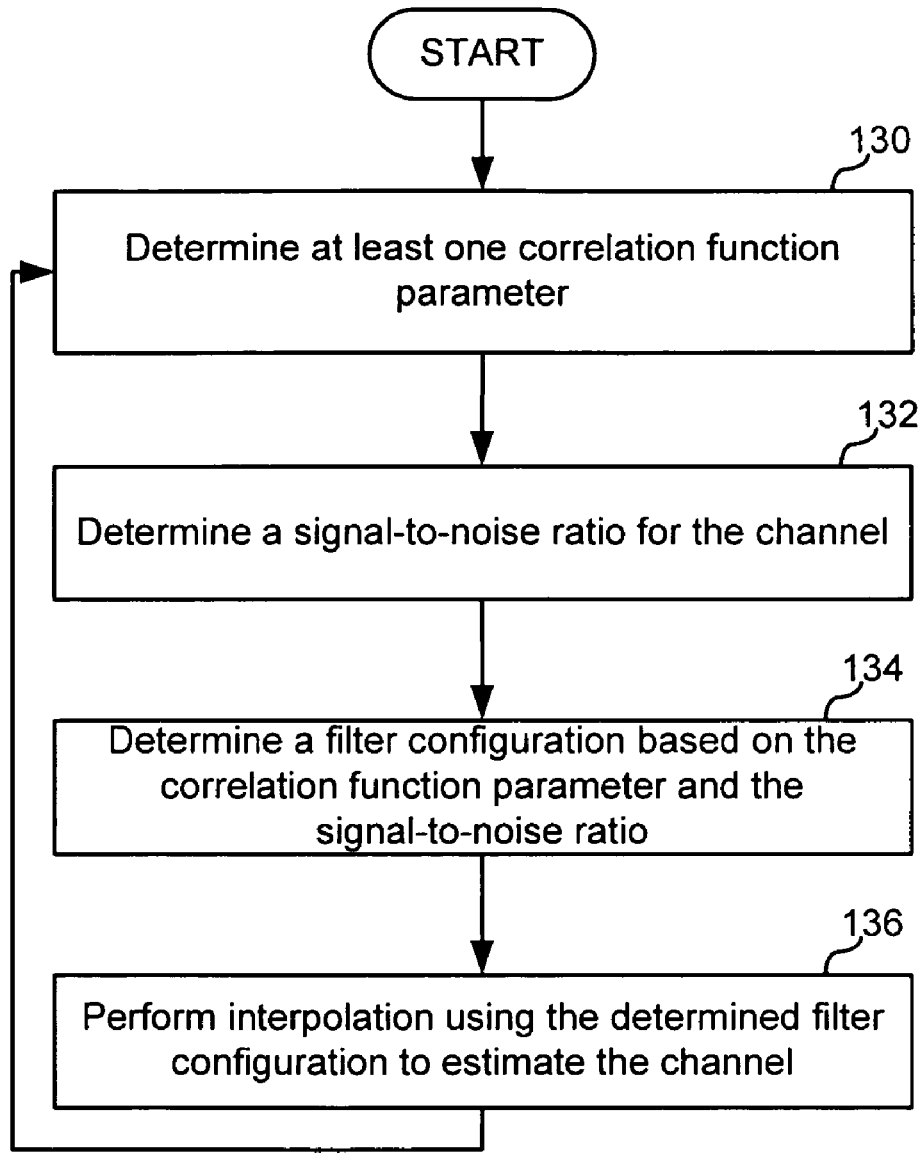
FIG. 21 is a flowchart of a method for adaptive interpolation filtering where the signal-to-noise ratio is determined and used according to another aspect.

In the method described above, the signal-to-noise ratio is not determined for use in configuring the filter 240. Instead, the filter configuration is determined based on the correlation function and, for example, a known typical operating point of the signal-to-noise ratio or a worst SNR where a system might operate. According to another aspect of the invention, depicted in FIG. 21, the signal-to-noise ratio is determined in the signal-to-noise ratio detector 235 and used in a method for adaptive interpolation filtering. In FIG. 21, at least one correlation function parameter of the correlation function for the channel is determined (130) by the correlation function parameter detector 230 in conjunction with the processor 250. Again, when the filter 240 is interpolating in time, the Doppler frequency shift is determined, and when the filter 240 is interpolating in frequency, the rms or maximum delay spread of the channel is determined. The signal-to-noise ratio of the channel is determined (132) by the signal-to-noise ratio detector 235 in conjunction with the processor 250. A filter configuration is determined (134) based on the correlation function and the signal-to-noise ratio. Again, the filter configuration may be calculated in real time or may be selected from a set of pre-computed filters in the memory 260. Interpolation is then performed (136) on the signal by the filter 240 using the determined filter configuration to estimate the channel. The method repeats to update the filter configuration, e.g., periodically.

The above methods for adaptive interpolation filtering refer to the use of either a filter that interpolates in time or frequency. As discussed above, when performing interpolation for channel estimation, one can alternatively use a two-dimensional filter, i.e., operating in time and frequency, or can use two one-dimensional filters consecutively; one for interpolation in time and one for interpolation in frequency. Here, any order between time and frequency interpolation may be used and the filters can be chosen independently of one another.

Figure 22:
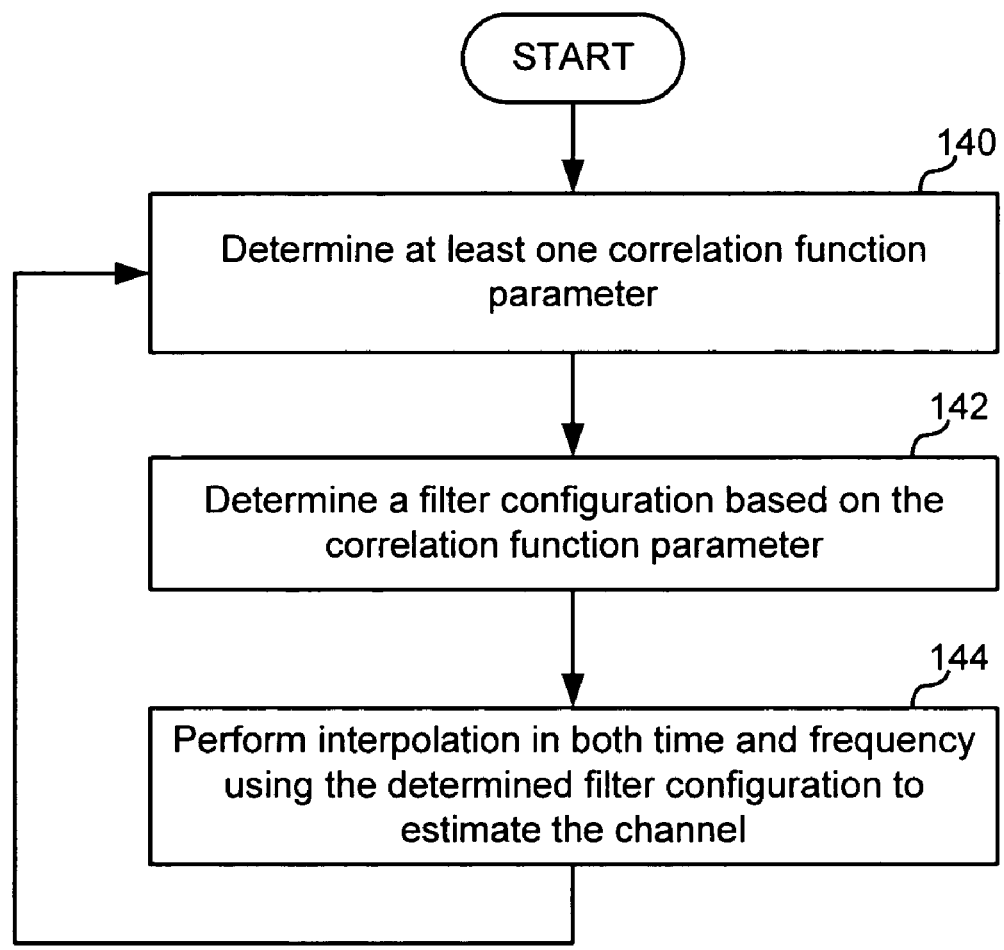
FIG. 22 is a flowchart of a method for adaptive interpolation filtering where a two-dimensional filter is used according to another aspect.

According to another aspect of the invention, depicted in FIG. 22, a method and apparatus for adaptive interpolation filtering includes a filter 240 that is a two-dimensional filter. In FIG. 22, at least one correlation function parameter of the correlation function for the channel is determined (140) by the correlation function parameter detector 230 in conjunction with the processor 250. For interpolating in time, the Doppler frequency shift is determined, and for interpolating in frequency, the rms or maximum delay spread is determined. A filter configuration is determined (142) by the processor based on the correlation function. Again, the filter configuration may be calculated in real time or may be selected from a set of pre-computed filters stored in a memory 260. Interpolation is then performed (144) on the signal by the two-dimensional filter 240 in both time and frequency using the determined filter configuration to estimate the channel. The method repeats to update the filter configuration, e.g., periodically. The signal-to-noise ratio of the channel may also optionally be determined and used in determining the filter configuration, as described above.

Figure 23:
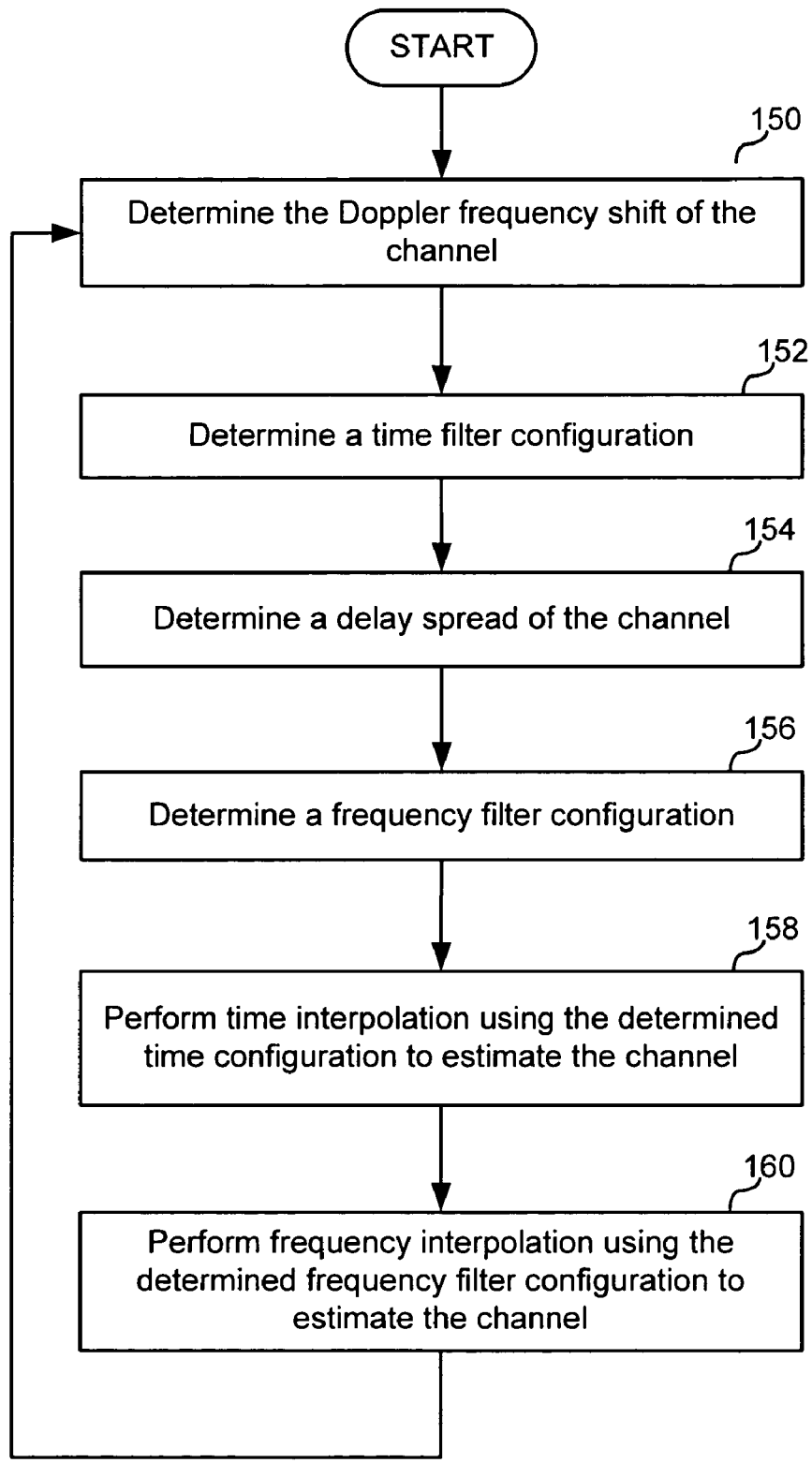
FIG. 23 is a flowchart of a method for adaptive interpolation filtering where two one-dimensional filters are used consecutively according to another aspect.

According to another aspect of the invention, depicted in FIG. 23, a method for adaptive interpolation filtering includes using two one-dimensional filters consecutively; one for interpolation in time and one for interpolation in frequency. In FIG. 23, interpolation in time is performed first, although the order can be reversed. The Doppler frequency shift for the channel is determined (150) by the correlation function parameter detector 230 in conjunction with the processor 250, for interpolating in time. A time filter configuration is determined (152) by the processor 250. The rms or maximum delay spread of the channel is determined (154) by the correlation function parameter detector 230 in conjunction with the processor 250, for interpolating in frequency. A frequency filter configuration is determined (156) by the processor 250. In each case, the filter configuration may be calculated in real time or may be selected from a set of pre-computed filters stored in memory 260. Interpolation is then performed in time (158) and frequency (160) on the signal by the respective filters 240 using the respective determined filter configurations to estimate the channel. The method repeats to update the filter configurations, e.g., periodically. The signal-to-noise ratio of the channel may also optionally be determined and used in determining either or both filter configurations.

Figure 24:
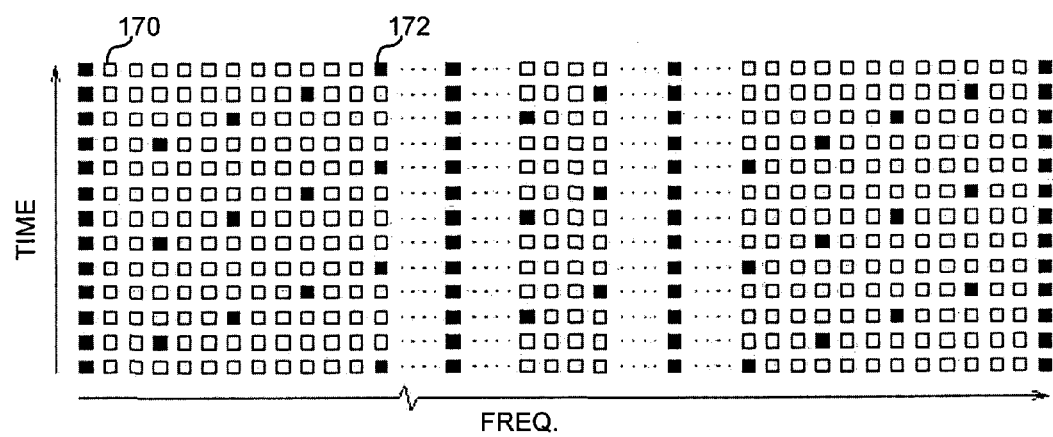
FIG. 24 is a graph depicting OFDM carriers in time and frequency.

In the graph of FIG. 24, each square 170 represents an OFDM carrier, with time on the vertical axis and frequency on the horizontal axis. The black squares 172 represent pilots. The graph represents a case where interpolation in time is first performed, resulting in pilots every third column and corresponding channel estimates. Next, interpolation in frequency is performed, so that all carriers are estimated.

It will be appreciated that procedures described above are carried out repetitively as necessary to respond to the time-varying characteristics of the channel between the transmitter and receiver.

To facilitate an understanding of exemplary embodiments, many aspects are described in terms of sequences of actions that can be performed by elements of a computer system. For example, it will be recognized that in each of the embodiments, the various actions can be performed by specialized circuits or circuitry (e.g., discrete logic gates interconnected to perform a specialized function), by program instructions being executed by one or more processors, or by a combination of both.

Moreover, the sequences of actions can be embodied in any computer readable medium for use by or in connection with an instruction execution system, apparatus, or device, such as a computer based system, processor containing system, or other system that can fetch the instructions from a medium and execute the instructions.

As used herein, a "computer readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non exhaustive list) of the computer readable medium can include the following: an electrical connection having one or more wires, a portable computer diskette, a random access memory (RAM), a read only memory (ROM), an erasable programmable read only memory (EPROM or Flash memory), an optical fiber, and a portable compact disc read only memory (CDROM).

Thus, the invention can be embodied in many different forms, and all such forms are contemplated to be within the scope of what is claimed. Any such form of embodiment can be referred to herein as "logic configured to" perform a described action, or alternatively as "logic that" performs a described action.

It will be appreciated by those of ordinary skill in the art that the invention can be embodied in various specific forms without departing from its essential characteristics. The disclosed embodiments are considered in all respects to be illustrative and not restrictive. The scope of the invention is indicated by the appended claims, rather than the foregoing description, and all changes that come within the meaning and range of equivalents thereof are intended to be embraced thereby.

It should be emphasized that the terms "comprises" and "comprising," when used in this description and claims, are taken to specify the presence of stated features, steps, or components, but the use of these terms does not preclude the presence or addition of one or more other features, steps, components, or groups thereof.

What is claimed is:

1. A method of adaptive interpolation filtering a signal in a receiver, comprising:
    determining at least one correlation function parameter of a channel;
    determining an asymmetric filter configuration based on the correlation function parameter; and
    performing interpolation filtering on the signal using the determined filter configuration;

wherein determining the filter configuration includes selecting one of a plurality of predetermined configurations having different complexities but having equivalent buffering requirements.

2. The method of claim 1, comprising:
determining a signal-to-noise ratio associated with the signal; and
determining an asymmetric filter configuration based on the correlation function parameter and the signal-to-noise ratio.

3. The method of claim 1, wherein determining the filter configuration includes basing the determination on a predetermined threshold signal-to-noise ratio associated with the signal, below which the signal cannot be processed.

4. The method of claim 1, wherein the at least one correlation function parameter includes a Doppler frequency shift and the performing interpolation filtering includes performing interpolation in time.

5. The method of claim 4, further comprising:
determining a delay spread of the channel;
determining a filter configuration based on the delay spread; and
performing interpolation filtering on the signal in frequency using the determined filter configuration.

6. The method of claim 4, wherein the Doppler frequency shift is estimated using at least one of a level crossing rate method and a zero crossing rate method.

7. The method of claim 1, wherein determining the filter configuration includes selecting one of a plurality of predetermined configurations having different complexities but having the same buffering requirements.

8. The method of claim 7, wherein:
interpolation is performed in time;
the at least one correlation function parameter is a Doppler frequency shift;
each of the plurality of predetermined configurations correspond to the Doppler frequency shift; and
the complexity of the selected predetermined configuration increases as the Doppler frequency shift increases.

9. The method of claim 1, wherein performing interpolation filtering includes interpolating two-dimensionally in both frequency and time.

10. The method of claim 1, wherein the signal is an orthogonal frequency division multiplexing (OFDM) signal.

11. The method of claim 1, wherein the signal is a digital video broadcasting (DVB) signal.

12. A method of adaptive interpolation filtering a signal in a receiver, comprising:
determining a Doppler frequency shift of a channel;
determining a first asymmetric filter configuration based on the Doppler frequency shift;
performing interpolation filtering in time on the signal using the determined first filter configuration;
determining a delay spread of the channel;
determining a second filter configuration based on the delay spread; and
performing interpolation filtering on the signal in frequency using the determined second filter configuration;
wherein at least one of determining the first filter configuration and determining the second filter configuration includes selecting one of a plurality of predetermined configurations having different complexities but having equivalent buffering requirements.

13. The method of claim 12, wherein determining a delay spread of the channel comprises determining at least one of a maximum delay spread and a root mean square delay spread, the one being selected based on an estimate of the shape of the channel profile.

14. An apparatus for adaptive interpolation filtering a signal in a receiver, comprising:
logic that determines at least one correlation function parameter of a channel;
logic that determines an asymmetric filter configuration based on the correlation function parameter; and
logic that performs interpolation filtering on the signal using the determined filter configuration;
wherein the logic that determines the filter configuration selects one of a plurality of predetermined configurations having different complexities but having equivalent buffering requirements.

15. The apparatus of claim 14, comprising:
logic that determines a signal-to-noise ratio associated with the signal; and
logic that determines an asymmetric filter configuration based on the correlation function parameter and the signal-to-noise ratio.

16. The apparatus of claim 14, wherein the logic that determines the filter configuration bases the determination on a predetermined threshold signal-to-noise ratio associated with the signal, below which the signal cannot be processed.

17. The apparatus of claim 14, wherein the at least one correlation function parameter includes a Doppler frequency shift and the performing interpolation filtering includes performing interpolation in time.

18. The apparatus of claim 17, further comprising:
logic that determines a delay spread of the channel;
logic that determines a filter configuration based on the delay spread; and
logic that performs interpolation filtering on the signal in frequency using the determined filter configuration.

19. The apparatus of claim 17, wherein the Doppler frequency shift is estimated using at least one of a level crossing rate method and a zero crossing rate method.

20. The apparatus of claim 14, wherein the logic that determines the filter configuration selects one of a plurality of predetermined configurations having different complexities but having the same buffering requirements.

21. The apparatus of claim 20, wherein:
interpolation is performed in time;
the at least one correlation function parameter is a Doppler frequency shift;
each of the plurality of predetermined configurations correspond to the Doppler frequency shift; and
the complexity of the selected predetermined configuration increases as the Doppler frequency shift increases.

22. The apparatus of claim 14, wherein the logic that performs interpolation filtering interpolates two-dimensionally in both frequency and time.

23. The apparatus of claim 14, wherein the signal is an orthogonal frequency division multiplexing (OFDM) signal.

24. The apparatus of claim 14, wherein the signal is a digital video broadcasting (DVB) signal.

25. An apparatus for adaptive interpolation filtering a signal in a receiver, comprising:
logic that determines a Doppler frequency shift of a channel;
logic that determines a first asymmetric filter configuration based on the Doppler frequency shift;
logic that performs interpolation filtering in time on the signal using the determined first filter configuration;
logic that determines a delay spread of the channel;

logic that determines a second filter configuration based on the delay spread; and logic that performs interpolation filtering on the signal in frequency using the determined second filter configuration;

wherein at least one of the logic that determines the first filter configuration and the logic that determines the second filter configuration selects one of a plurality of predetermined configurations having different complexities but having equivalent buffering requirements.

26. The apparatus of claim 25, wherein determining a delay spread of the channel comprises determining at least one of a maximum delay spread and a root mean square delay spread, the one being selected based on an estimate of the shape of the channel profile.

* * * * *

UNITED STATES PATENT AND TRADEMARK OFFICE
CERTIFICATE OF CORRECTION

| | |
|---|---|
| PATENT NO. | : 7,433,433 B2 |
| APPLICATION NO. | : 10/920928 |
| DATED | : October 7, 2008 |
| INVENTOR(S) | : Wilhelmsson et al. |

It is certified that error appears in the above-identified patent and that said Letters Patent is hereby corrected as shown below:

In Column 6, Line 63, delete "Us." and insert -- µs. --, therefor.

In Column 7, Line 45, in Equation (3), delete " 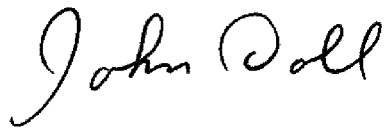 " and insert -- $r(\tau) = J_O(2\pi f_D|\tau|)$, --, therefor.

In Column 7, Line 46, delete "T" and insert -- $\tau$ --, therefor.

Signed and Sealed this

Thirty-first Day of March, 2009

JOHN DOLL
*Acting Director of the United States Patent and Trademark Office*